Patented June 28, 1927.

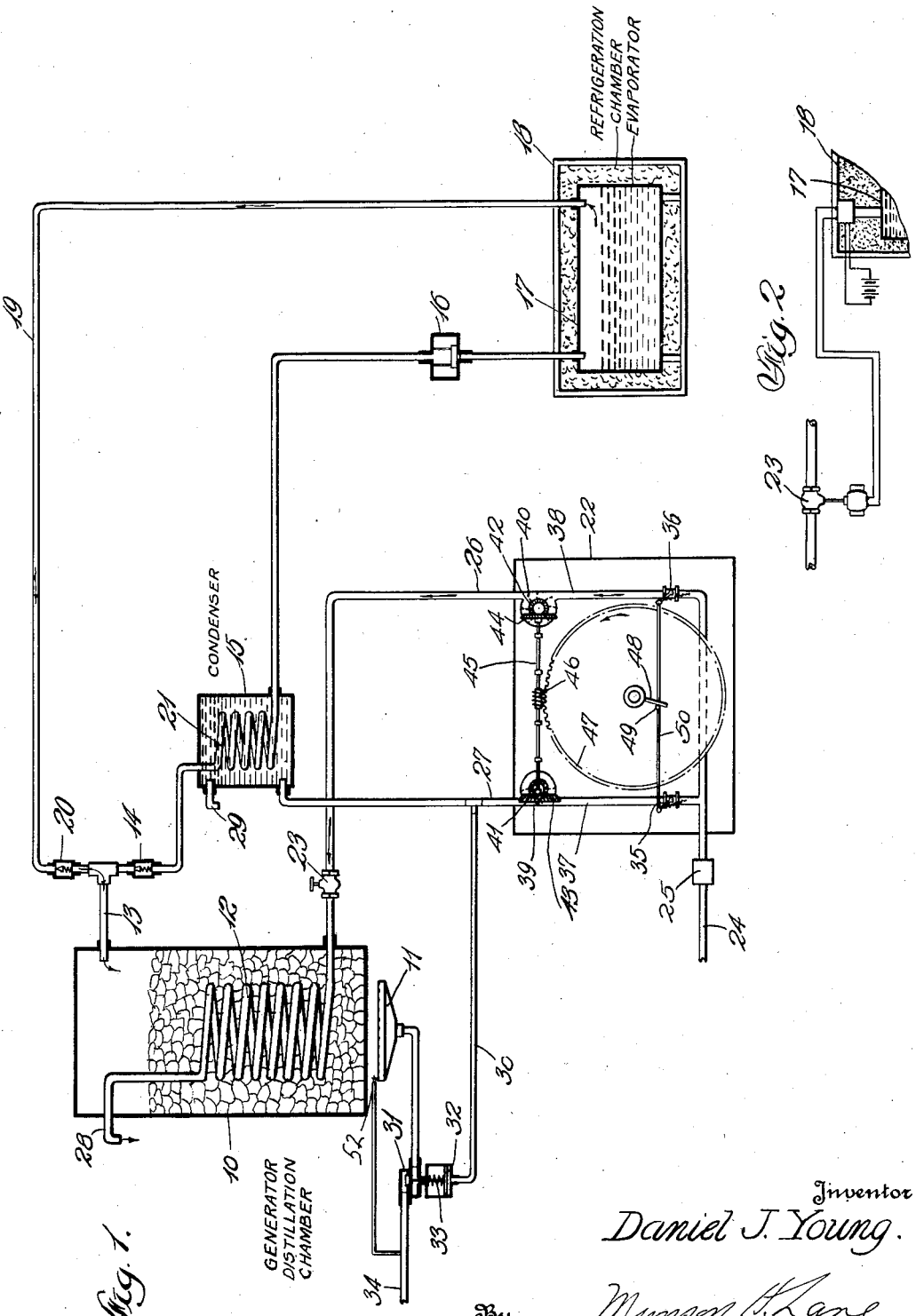

1,634,129

UNITED STATES PATENT OFFICE.

DANIEL J. YOUNG, OF TACOMA, WASHINGTON.

REFRIGERATION PROCESS AND APPARATUS.

Application filed October 20, 1925. Serial No. 63,624.

The invention relates to a refrigeration process and apparatus, and more particularly to the absorption type of refrigeration.

The object of the invention is broadly to provide a simple and effective control system adapted primarily to absorption type refrigeration.

The control system which I have invented does away with the use of complicated electrical and mechanical systems, which are expensive to install and which frequently get out of order.

Refrigeration processes of the absorption type consist generally of two cycles, one of which includes the step of expelling a refrigerant from an absorbent or adsorbent medium, with the subsequent cooling, and in some instances, condensing of the refrigerant, the other cycle including the steps of expanding or evaporating the refrigerant and the subsequent absorption of the refrigerant in the absorbent medium.

During the first cycle, heat is applied to the absorbent to expel the refrigerant, and a cooling fluid, generally water, is employed during the cooling step. During the other cycle the heat is withdrawn from the absorbent, and a cooling fluid is generally applied instead. These cycles are successive and should follow each other without any delay.

According to my process, I propose to control the cycles by measuring the quantity of cooling fluid passing during each cycle, using a fluid meter of any desired type for this purpose, and automatically transferring the cooling fluid from the cooler to the absorber and vice versa, as soon as a given quantity of fluid has passed. I propose also to regulate the rate of flow of cooling fluid during one of the cycles by interposing a manually or thermostatically adjustable valve in the cooling system, preferably between the meter and coil which serves to cool the absorbent. It is further desirable to automatically regulate the supply of heat to the generator by means of the meter which controls the cooling fluid, and this also constitutes one feature of my invention.

Any suitable substances may be used as absorbent, and refrigerant media. I prefer to use calcium chloride and ammonia and will describe my process in connection therewith but it will be understood that the invention is by no means limited to the use of these materials.

For the purpose of illustration, I have shown one embodiment of the invention in which Fig. 1 is a diagrammatic view showing the system as a whole, and Fig. 2 is a detail view showing a thermostatic means for regulating the control valve for the cooling fluid passing through the generator.

In the drawings, the reference numeral 10 denotes a tight container, or absorber-generator, containing calcium chloride or other material which will absorb the material to be used as a refrigerant. I prefer to use calcium chloride ($CaCl_2$) and ammonia ($NH_3$). Under normal temperatures $CaCl_2$ and $NH_3$ combine to form $CaCl_2 8NH_3$. If heat is applied to this combination as for example by means of a gas burner 11, or other heating means, the ammonia is driven off as a gas, and if sufficient heat is applied all the $NH_3$ may be expelled. Practical limitations, however, are that heat is supplied in amounts sufficient only to reduce the combination to $CaCl_2 4NH_3$. If heat is now removed and the absorbent compound cooled the ammonia will be reabsorbed to produce the original compound, $CaCl_2 8NH_3$. Heat is generated by the absorption and the rapidity of the absorption is governed by the rate of circulation of water or other cooling fluid through the absorbent.

Tracing the path of the refrigerant from the generator 10 as heat is supplied by means of the burner 11, ammonia is driven off as a gas and produces pressure, as the system is entirely closed. The ammonia passes through pipe 13, check valve 14 and through coil 21 of a water cooled condenser 15, where under the pressure and temperature conditions there existing the ammonia is liquefied and flows to valve 16. This is a liquid float valve and is necessary to insure the ammonia becoming liquid before passing through the system and into the evaporating chamber 17 of the refrigerator 18.

After a certain period of application of heat to the generator 10, all the ammonia available is transferred to the chamber 17 and is in liquid form. At this time the heat is turned off and the water previously passing through the condenser is now passed through the coil 12 of the generator in order to cool off and keep cool the absorbent. As the absorbent is cooled the pressure in the chamber 10 is diminished and the ammonia commences to pass from the evaporator through pipe 19 and check valve 20 into the generator-absorber 10 where it is absorbed by the absorbent medium therein. It will be noted that the rapidity of the evaporation and absorption is governed by the rate of flow of the water through the cooling coil 12.

It is a desirable condition that the generating or heating cycle take a predetermined or fixed time with a predetermined or fixed amount of heat, and that the absorption cycle take an amount of time dependent on the work to be accomplished. These results may be obtained by passing a given amount of cooling fluid through the condenser at a given rate during the generating or heating cycle, and passing a given amount of fluid through the absorber during the absorption cycle, but varying the rate of flow of said fluid during the absorption cycle to suit the particular condition.

It is furthermore essential that the application of heat to the generator take place only when cooling fluid is flowing through the condenser, and that the heat be turned off when the cooling fluid is flowing through the absorber.

I propose to control these various functions by means of a fluid meter 22 and valve 23 which are interposed in the cooling fluid system and which will now be described in detail.

As shown, water, or other cooling fluid is supplied to the meter 22 through pipe 24 from any suitable source of supply, as the water main. The inlet water pressure must be constant, and if not constant when coming from the source of supply, a pressure regulator 25 of any desired construction will be employed to insure constant pressure.

The meter may be of any desired type, having one inlet and two outlets 26 and 27. These outlets are suitably controlled by valve mechanism so that only one will be open at any given time. The meter registering device is so connected to this valve mechanism that it changes the flow of water from one outlet to the other, whenever a predetermined amount of water has passed that outlet.

As shown, a pair of valves 35 and 36 are interposed in the left and right hand branches 37, 38 respectively of the meter, and means are provided for simultaneously opening one valve and closing the other. Likewise, a pair of water operated wheels 39 and 40 are placed in the branches 37 and 38 respectively. These water wheels are provided with gears 41, 42, meshing with gears 43, 44 respectively, both of which are mounted upon a rod 45. The rod 45 carries a worm 46 which meshes with a wheel 47. The wheel 47 carries a rod 48 which at a certain point in its rotation engages a pin 49 carried by a rod 50 which connects valves 35 and 36. Thus, it will be seen that when a given quantity of water has flowed through one branch of the system, the meter valves will be reversed and water will flow through the other branch until an equal quantity of water has flowed, when another reversal will take place. The particular control device forms no part of the present invention and is described for the purpose of illustration only.

The outlet pipe 26 leads to the coil 12 in the absorber 10 and thence to a drain 28. The regulating valve 23 is located in this pipe for governing the rate of flow through this branch of the system. The valve 23 may be operated either manually as shown in Fig. 1 or automatically by means of a thermostat in the refrigeration chamber 18 as shown in Fig. 2 or elsewhere, if desired. In practice the manual control will generally be sufficient.

The other branch of the cooling system includes the pipe 27, condenser 15 and drain 29. Preferably a branch pipe 30 communicates with pipe 27 and controls the supply of gas to the burner 11, by means of a valve 31 interposed in the gas pipe 34, and operated by means of a piston 32 controlled by the water pressure. The arrangement is such that when water is flowing through the condenser gas will be supplied to the burner, and if no water is flowing through the condenser the valve 31 will be closed by a spring 33, thus cutting off the gas. Obviously some sort of pilot light 52 or similar device will be necessary in order to insure the relighting of the burner when the gas is again turned on. It is also apparent by slight modifications, water pressure could be used to control a supply of electricity or other heating means, without departing from the spirit of the present invention.

The complete operation of the refrigerating system will now be briefly reviewed.

Starting with the beginning of the heating or generating cycle, the meter 22 is, at this time, in a position such that cooling fluid is flowing from the outlet 27 through condenser 15 to the drain 29. Pressure being on this line, the valve 31 is open and heat is applied to the generator 10. The water pressure being constant and the friction in this branch being constant, it is obvious that the predetermined amount of water flowing through will consume a definite time. At the end of this period all the ammonia to be used will be in the compartment 17 in liquid form.

When the given quantity of water has passed through the meter, the cycle is reversed and water flows through outlet 26 and coil 12. No pressure being on valve 31, it closes under the action of spring 33, and the heat is turned off.

The water now flows through the generator, and the pressure therein is reduced, causing a reverse flow of ammonia to take place from the evaporator 17 to the absorber. The rapidity of this evaporation (refrigeration) is governed by the rate of flow of the cooling fluid through the absorbent medium, which in turn may be regulated at will by opening or closing the valve 23. The evaporation of the liquid ammonia causes cooling of the brine or other medium surrounding the same, according to the well recognized principles of refrigeration. The time of this evaporation or refrigeration period is governed by the amount of fluid flowing through the control 22 and this part of the process will continue until a definite amount of cooling fluid has passed. From this it will be seen that a fixed heating time is secured in a simple and convenient manner, and an evaporation or a refrigeration period variable at will by a means of manually operated valve or the like or automatically by thermostatic means.

In the specification and claims I have used the term, "absorbent", but it is intended by this term to cover "adsorbent" phenomena as well as ordinary absorption.

While a particular embodiment of the system has been described in detail for the purpose of illustration, it will be evident that many changes will occur to one skilled in the art without departing from the spirit of the invention.

Having thus described my invention, what I claim as new and desire to secure by Letters Patent is:—

1. In a refrigeration process of the generating and absorption type, consisting of successive cycles, one cycle including the successive steps of heating an absorbent medium to expel a refrigerant therefrom and subsequently cooling said refrigerant by the use of a cooling fluid, the other cycle including the steps of expanding the refrigerant and subsequently absorbing the same in said absorbent medium with the use of the cooling fluid for said absorbent medium, the improvement which consists in using a measured volume of cooling fluid during each cycle, and alternating the cycles when a predetermined volume of said fluid has passed.

2. In the improved process as defined in claim 1, the step which consists in regulating the rate of flow of said cooling fluid during one of said cycles.

3. A process of refrigeration as defined in claim 1, in which the application of heat to the absorbent is controlled by the flow of the cooling fluid.

4. In a refrigeration apparatus of the absorption type including an absorber-generator, a condenser and an evaporator with suitable connections therebetween for the passage of a refrigerant, in combination, a circulating system for cooling fluid, including a source of fluid supply, a fluid meter control and two pipe lines controlled by said fluid meter control, one line including said condenser and the other said absorber generator, said fluid meter control serving to alternately connect said pipe lines with said source of supply when a predetermined volume of fluid has passed through the meter.

In testimony whereof I affix my signature.

DANIEL J. YOUNG.